(12) United States Patent
Ovsepyan

(10) Patent No.: US 6,260,819 B1
(45) Date of Patent: Jul. 17, 2001

(54) LOCKING VALVE

(75) Inventor: Vagan Ovsepyan, Tujunga, CA (US)

(73) Assignee: Southern Spears Manufacturing Co., Sylmar, CA (US)

( * ) Notice: Subject to any disclaimer, the term of this patent is extended or adjusted under 35 U.S.C. 154(b) by 0 days.

(21) Appl. No.: 09/420,886

(22) Filed: Oct. 19, 1999

(51) Int. Cl.$^7$ .................................... F16K 35/02

(52) U.S. Cl. .............................. 251/96; 251/95

(58) Field of Search ................ 137/385, 384.8, 137/384.2; 251/95, 96, 99, 100, 101, 102, 104, 105, 106, 110

(56) References Cited

U.S. PATENT DOCUMENTS

| | | | |
|---|---|---|---|
| 1,089,098 | * | 3/1914 | Winkler ................................... 251/96 |
| 3,054,303 | * | 9/1962 | Maney ............................... 251/95 X |
| 4,848,724 | * | 7/1989 | Pettinaroli .............................. 251/95 |
| 5,188,335 | * | 2/1993 | Pettinaroli .............................. 251/95 |
| 5,213,308 | * | 5/1993 | Jeromoson et al. ..................... 251/95 |
| 5,785,074 | * | 7/1998 | Kieper ............................... 137/385 X |

OTHER PUBLICATIONS

Drawing illustrating prior art valve. Valve in exitstence prior to invention of that which is claimed in the present application.

* cited by examiner

Primary Examiner—Joseph A. Kaufman
Assistant Examiner—Eric Keasel
(74) Attorney, Agent, or Firm—Sheldon & Mak; Denton L. Anderson

(57) ABSTRACT

The invention is a valve that releasably locks the valve in both the open position and the closed position. The valve has a valve body, a valve element, a handle, and a lock-out member that cooperates with the handle and the valve body to lock the handle and the valve element in either the open position or the closed position. The lock-out member has a collar that is rotatably mounted to the rim of the valve body. The collar has cogs that fit within notches in the rim and prevent the collar from rotating. The interlocking of the collar of the lock-out member with the valve body prohibits the rotation of the handle and the valve element. The lock-out member has a release member that cooperates with the handle to lift cogs out of the notches and cause the collar to disengage with the rim when the release member is activated. This allows the handle and the valve element to rotate between either the locked open position or the locked closed position.

2 Claims, 3 Drawing Sheets

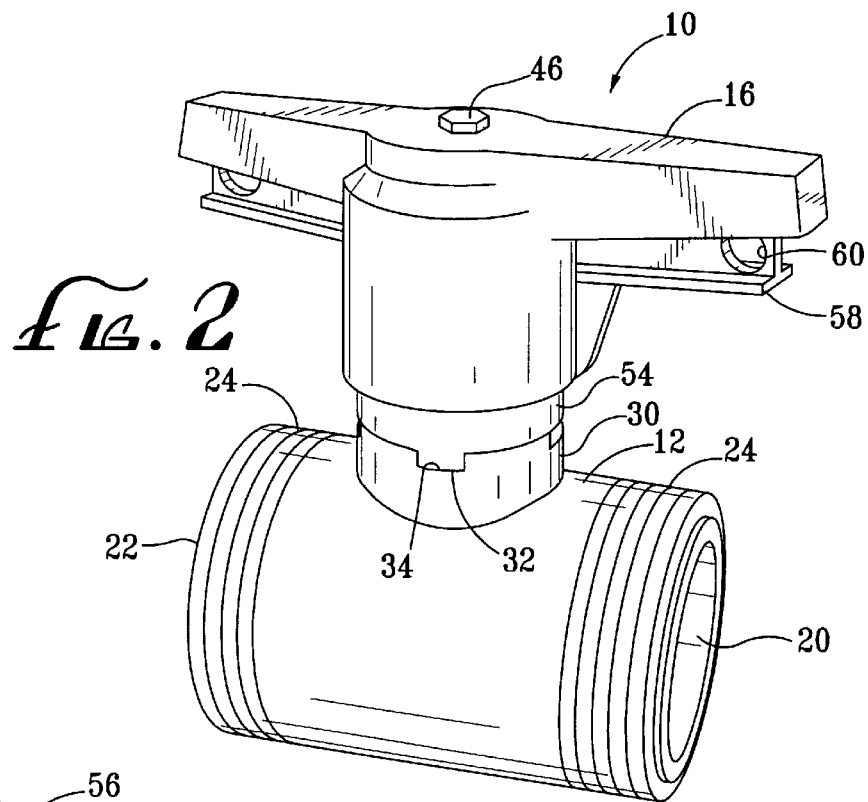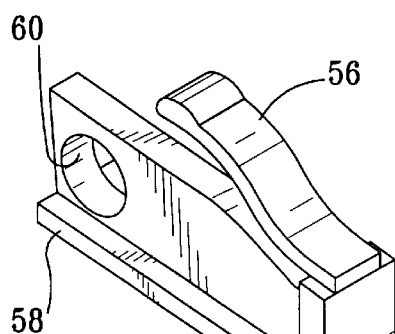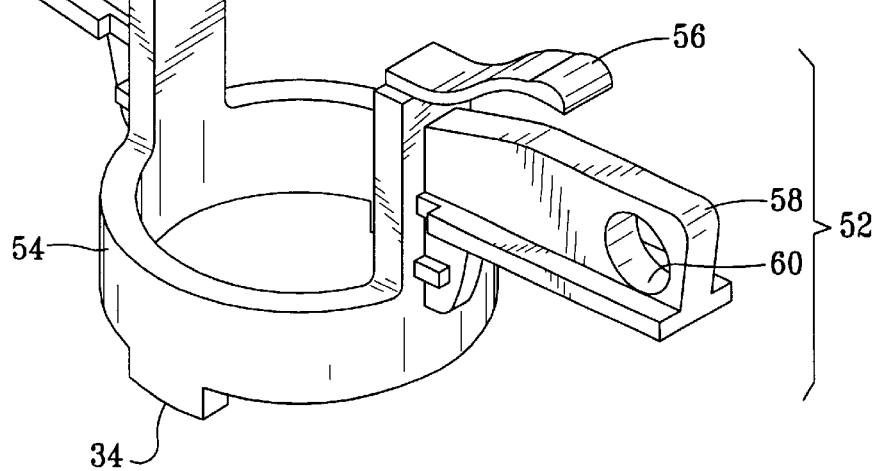

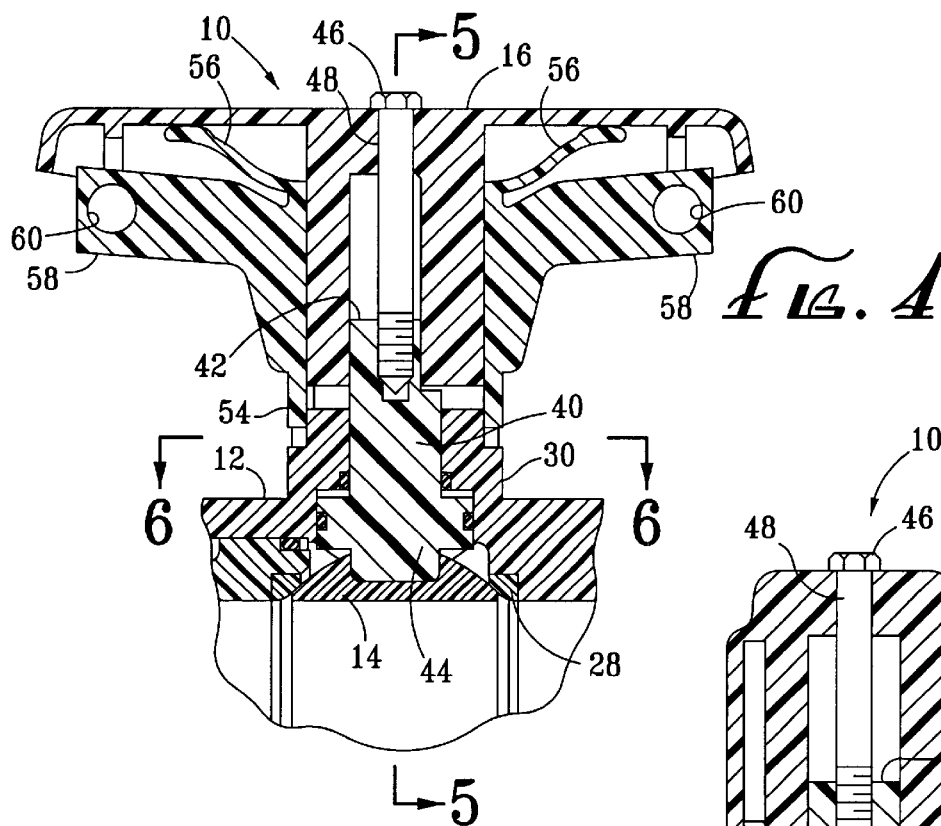
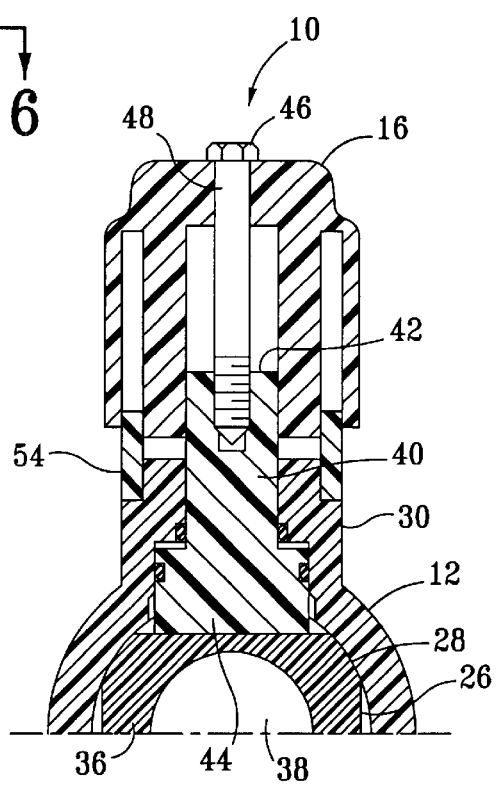
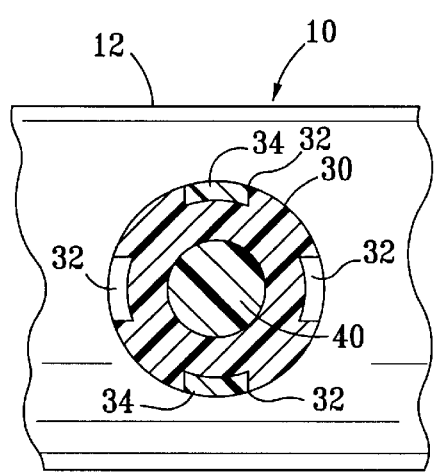

LOCKING VALVE

FIELD OF THE INVENTION

This invention relates generally to a valves, and, more specifically, to lockable valves.

BACKGROUND OF THE INVENTION

Valve locking devices have been used for some time to prevent unintentional or unauthorized opening and closing of valves. Some known locking devices cooperate with the valve handle to prevent rotation of the handle to the open position when the valve is locked. An advantage of this type of valve locking device is that a visual determination as to whether the valve is in the open position or the closed position can be made even at an appreciable distance from the valve.

The problem with these prior art valves is that they are only capable of locking the valve in the closed position and are unable to lock the valve in the open position. Thus, these prior art valves are unable to prevent the unintentional or unauthorized closing of the valve.

There is therefore a need for a valve locking device which allows the valve to be releasably locked in both the open position and the closed position.

SUMMARY

The invention satisfies this need. The invention is an improved valve that releasably locks the valve in both the open position and the closed position.

The invention is a valve comprising a valve body, a valve element, a handle, and a releasable locking means. The valve body comprises a first open end, a second open end, and a valve chamber disposed therebetween. The valve chamber comprises a valve seat. The valve element is disposed within the valve chamber and is rotatable a radial distance up to about 90 degrees between an open position wherein the valve is open and a closed position wherein the valve element is sealed to the valve seat so that the valve is closed. The handle is rotatably connected to the valve body and is connected to the valve element so as to rotate the valve element between the open position and the closed position. The releasably locked means functions to releasably lock the valve element in both the open position and the closed position.

In a preferred embodiment, the valve body further comprises a rim and the releasable locking means comprises a lock-out member having a collar rotatably mounted to the rim. The collar comprises at least one cog and the rim comprises at least two notches that are sized and dimensioned to accommodate the cog. The at least one cog fits within a notch in the collar to lock the collar at the open position or at the closed position and thus prevent the rotation of the handle and the valve element. The lock-out member further comprises a release member that cooperates with the handle to lift the at least one cog out of a notch and cause the collar to disengage with the rim. The collar disengages with the rim only when the release member is activated. This allows the handle and the valve element to rotate between either the locked open position or the locked closed position.

DRAWINGS

These features, aspects and advantages of the present invention will become better understood with regard to the following description, appended claims and accompanying figures where:

FIG. 2 is a perspective view of a valve having features of the invention;

FIG. 3 is a perspective view of a lock-out member useful in the valve illustrated in FIG. 2;

FIG. 4 is a cross-sectional view of the valve illustrated in FIG. 2;

FIG. 5 is a cross-sectional view of the valve illustrated in FIG. 4, taken along line 5—5; and FIG. 6 is a cross-sectional view of the valve illustrated in FIG. 4, taken along line 6—6.

DETAILED DESCRIPTION

Figure 1:
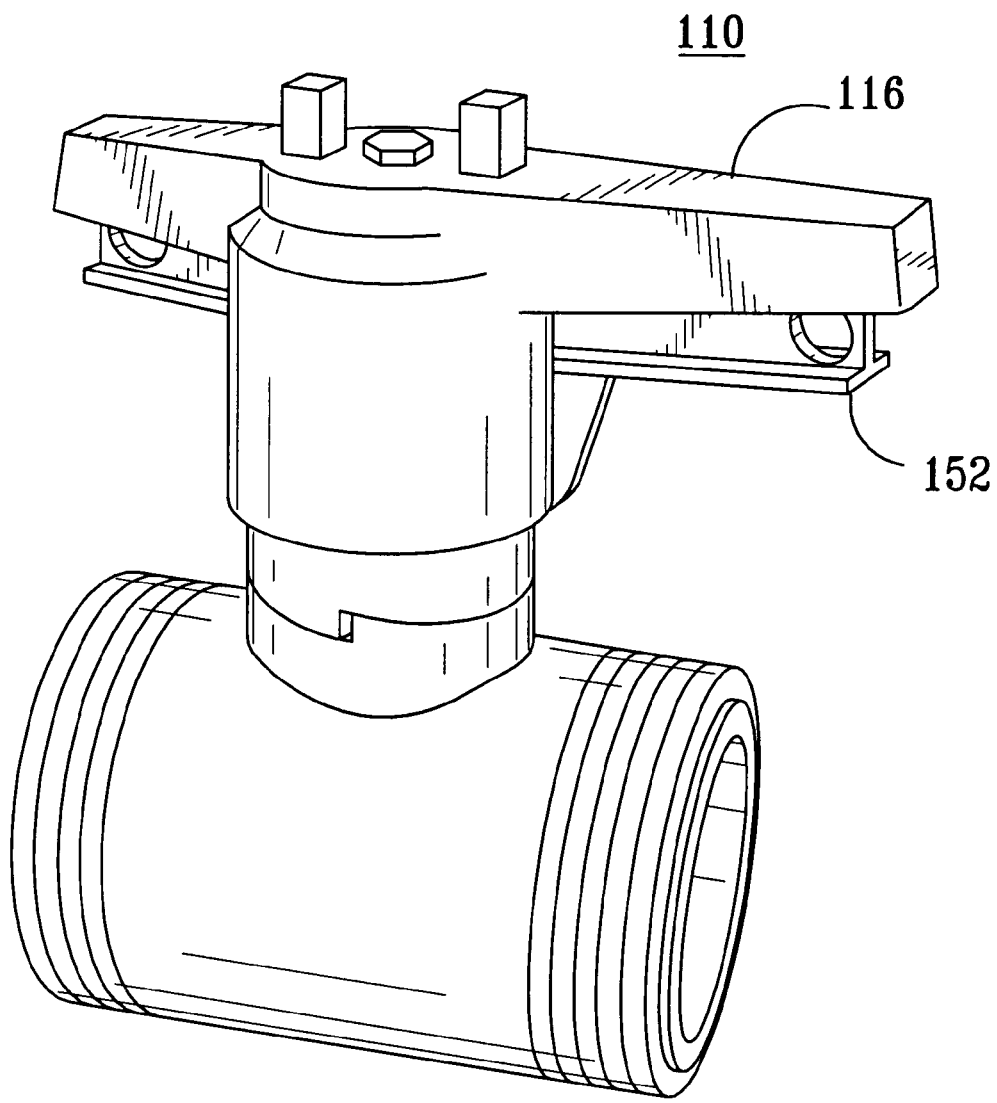
FIG. 1 is a perspective view of a prior art valve.

The following discussion describes in detail one embodiment of the invention and several variations of that embodiment. This discussion should not be construed, however, as limiting the invention to those particular embodiments. Practitioners skilled in the art will recognize numerous other embodiments as well.

With reference to the embodiment of the invention illustrated in FIGS. 2–6, the invention is a valve 10 comprising a valve body 12, a valve element 14, a handle 16, and a releasable locking means 18.

The valve body 12 comprises a first open end 20 and a second open end 22. Typically, the valve body 12 is substantially cylindrical and comprises threads 24 proximal to the first open end 20 and the second open end 22 for connecting the valve 10 to pipes, tubing, or other appropriate connectors. Referring to the embodiment as illustrated in FIG. 2, the threads 24 are external and located on the outer radial surface of the valve body 12. The valve body 12 further comprises a valve chamber 26 disposed between the first open end 20 and the second open end 22. The valve chamber 26 comprises a valve seat 28.

In a preferred embodiment, the valve body 12 comprises a rim 30 disposed on the outer surface of the valve body 12. Referring to the embodiment as illustrated in FIG. 2 and FIG. 6, the rim 30 is circular and has an outer radial surface. In the embodiment in the drawings, the rim 30 comprises four notches 32 that are disposed apart on the outer radial surface at 90 degree intervals. In alternative embodiments, the rim 30 may comprise a different number notches 32, but preferably comprises at least two notches 32. In the embodiment illustrated in the drawings, the notches 32 are substantially rectangular. However, in other embodiments the notches 32 are comprised of alternative shapes. In still other embodiments, the rim 30 comprises cogs 34 or a combination of both cogs 34 and notches 32.

The valve element 14 is disposed within the valve chamber 26 and is rotatable within the valve chamber 26. In a typical embodiment, such as a ball valve or a butterfly valve, the valve element 14 is rotatable a radial distance up to about 90 degrees within the valve chamber 26 between an open position wherein the valve 10 is open and a closed position wherein the valve 10 is closed. In the closed position the valve element 14 is sealed to the valve seat 28 such that the valve 10 is closed. Referring to the embodiment illustrated in FIG. 5, the valve 10 comprises a ball valve and the valve element 14 comprises a ball member 36 having a flow through passage 38. In the open position the flow through passage 38 of the ball member 36 is in flow through alignment with the first open end 20 and second open end 22 of the valve body 12. In an alternative embodiment, (not shown) the valve 10 is a butterfly valve and the valve element 14 comprises a substantially circular disk.

The handle 16 is rotatably connected to the valve body 12. The handle 16 is also in rotatable connection with the valve element 14 so as to rotate the valve element 14 between the open position and the closed position. Referring to the embodiment as illustrated in FIG. 4, the handle 16 is connected to the valve element 14 by a valve stem 40 having a first end 42 and a second end 44. The valve stem 40 is connected to the handle 16 at the first end 42 and is connected with the valve element 14 at the second end 44 such that rotation of the handle 16 causes rotation of the valve element 14. As illustrated in FIGS. 4 and 5, the handle 16 is fastened to the first end 42 of the valve stem 40 by a handle bolt 46. As illustrated in FIGS. 2 and 4, the handle bolt 46 is set within a handle hole 48 disposed at the middle of the longitudinal axis of the handle 16 such that the handle 16 is symmetrically disposed about the valve stem 40. Referring to the embodiment as illustrated in FIG. 4, the longitudinal axis of the handle 16 is oriented substantially parallel to the longitudinal axis of the valve body 12 when the valve 10 is in the open position. Conversely, the longitudinal axis of the handle 16 is oriented substantially perpendicular to the longitudinal axis of the valve body 12 when the valve 10 is in the closed position.

The releasable locking means 18 for releasable locking the valve element 14 in both the open position and the closed position functions by cooperating with the valve body 12 to prevent the rotation of the valve element 14. Preferably, the rim 30 of the valve body 12 cooperates with the releasable locking means 18 to releasably lock the valve element 14. The releasable locking means 18 also locks the handle 16 in a corresponding open position or closed position, either by cooperating directly with the handle 16 or by operating independently of the handle 16.

In one embodiment (not shown), the releasable locking means 18 comprises a pin member that is secured to the valve body 12 and reversibly moves in and out of either the handle 16, the valve stem 40, or the valve element 14 to block the rotation of all of these elements so as to lock the valve element 14 in both the open position and the closed position. In an alternative embodiment (not shown), the releasable locking means 18 comprises a pin member that is secured to the handle 16 and reversibly moves in and out of the valve body 12 to block the rotation of the handle 16, the valve stem 40, and the valve element 14 so as to lock the valve element 14 in both the open position and the closed position.

In a preferred embodiment, the releasable locking means 18 comprises a lock-out member 50 that interlocks with the valve body 12 to lock the valve element 14 in both the open position and the closed position. The lock-out member 50 comprises a release member 52 which unlocks the valve element 14 and allows the valve element 14 to rotate between the open position and the closed position. Referring to the embodiment as illustrated in FIG. 3, the lock-out member 50 comprises a collar 54 that is rotatably mounted to the rim 30 of the valve body 12. In an alternative embodiment, the collar 54 is rotatably mounted directly to a valve body 12 not having a rim 30.

Preferably, the collar 54 of the lock-out member 50 comprises at least one cog 34 that fits within one of at least two notches 32 disposed within the rim 30 or the valve body 12. The dimensions of the notches 32 and cogs 34 are proportioned to the size of the valve 10. Each notch 32 is typically sized and dimensioned slightly larger than each cog 34 in order to accommodate a cog 34. Typically, the width of each cog 34 and each notch 32 is between about 1/8 inches and about 2 inches. Typically, the height of each cog 34 as measured from the collar 54 and the depth of each notch 32 is between about 0.0625 inches and about 1 inches. In the embodiment illustrated in the drawings, the collar 54 comprises two cogs 34 that are disposed apart 180 degrees on the radial surface of the collar 54. In an alternative embodiment (not shown), the collar 54 comprises one or more notches 32 and the rim 30 comprises one or more cogs 34 such that the notches 32 of the collar 54 are sized and dimensioned to accommodate the cogs 34 on the rim 30. In still another embodiment (not shown), the collar 54 comprises a combination of one or more cog 34 and one or more notch 32 and the rim 30 comprises one or more notch 32 and one or more cog 34 such that the notches 32 are sized and dimensioned to accommodate the cogs 34.

In a preferred embodiment, the lock-out member 50 comprises a release member 52 that cooperates with the handle 16, wherein upon engagement of the release member 52 at least a portion of the release member 52 retracts within the handle 16 and the lock-out member 50 moves away from the valve body 12. The movement of the lock-out member 50 lifts the at least one cog 34 out of a notch 32 so that the collar 54 disengages with the rim 30 to enable the handle 16 and the valve element 14 to rotate between a locked open position and a locked closed position.

Referring to the embodiment as illustrated in FIG. 3 and FIG. 4, the collar 54 interlocks with the rim 30 when the two cogs 34 drop into notches 32 in the rim 30. The cogs 34 are displaced in different notches 32 when the valve 10 is in the open position compared to when the handle 16 is rotated about 90 degrees and valve 10 is in the closed position.

As illustrated in FIG. 3 and FIG. 4, the release member 52 comprises two cantilevered springs 56 disposed against the handle 16 and two cantilevered handle engagement members 58 attached to the collar 54. Upon compression of the cantilevered handle engagement members 58 against the handle 16, the cantilevered springs 56 become compressed such that the collar 54 moves toward the handle 16 and the cogs 34 are lifted out of the notches 32 whereby the collar 54 disengages with the rim 30 to enable the handle 16 and the valve element 14 to rotate between the locked open position and the locked closed position. As illustrated in FIG. 3 and FIG. 4, the handle engagement members 58 comprise two holes 60 to accommodate a padlock or equivalent device. Placement of a padlock in at least one of the holes 60 prevents engagement of the release member 52 to unlock the valve element 14 by blocking the movement of the handle engagement members 58 toward the handle 16.

Typically, the valve 10 is comprised of plastic. However, the valve 10 may be comprised of any suitable material including metals such as brass, copper, or bronze. In a typical embodiment, the diameter of the valve body 12 is between about 3/4 inches and about 14 inches, the length of the valve body 12 along it's longitudinal axis is between about 1 inches and about 24 inches, and the length of the handle 16 along it's longitudinal axis is between about 1½ inches and about 30 inches.

The valve 10 of the invention is contrasted with prior art valves 110, as illustrated in FIG. 1, by the releasable locking means 18 that cooperates with the valve body 12 to releasably lock the valve element 14 in both the open position and the closed position. As illustrated in FIG. 1, the handle 116 of the prior art valve is prevented from rotating counterclockwise unless the release member 152 is engaged, however, even when locked, the handle 116 of prior art valves can be freely rotated clockwise to the closed position. This is in contrast to the embodiment of the invention illustrated in FIG. 2, which locks the valve element 14 in both the open position and the closed position by preventing both the clockwise and the counterclockwise rotation of the handle 16 and valve element 14 due to the cooperation of the cogs 34 of the releasable locking means 18 with the collar 54 of the valve body 12.

In operation, a user can easily identify whether the valve 10 is in the open or closed position because the longitudinal axis of the handle 16 is oriented substantially parallel to the longitudinal axis of the valve body 12 when the valve 10 is in the open position. A user wishing to turn the valve 10 on or turn the valve 10 off first unlocks and removes any padlock situated in the holes of the handle engagement members 58. The user then compresses the handle engagement members 58 against the handle 16 to engage the release member 52. The user then rotates the handle 16 about 90 degrees between the open position and the closed position. The handle 16 locks only in either of these two positions. The user then releases the handle engagement members 58 and the lock-out member 50 interlocks with the valve body 12 to prevent the handle 16 and valve element 14 from rotating. The user then replaces the padlock into one of the holes in the handle engagement members 58 to prevent any unauthorized or unintentional change in the valve position.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A valve comprising:
   (a) a valve body having a first open end, a second open end, and a valve chamber disposed therebetween, the valve chamber comprising a valve seat, the valve body having a rim disposed on the surface of the valve body above the valve chamber;
   (b) a valve element disposed within the valve chamber, the valve element being rotatable a radial distance up to about 90 degrees between an open position wherein the valve is open and a closed position wherein the valve element is sealed to the valve seat so that the valve is closed;
   (c) a handle rotatably connected to the valve body, the handle being connected to the valve element so as to rotate the valve element between the open position and the closed position; and
   (d) a lock-out member for releasably locking the valve element in both the open position and the closed position, the lock-out member comprising a collar rotatably mounted to the rim, the collar having at least one cog and the rim having at least two notches that are sized and dimensioned to accommodate the cog so as to lock the collar at the open position and at the closed position, the lock-out member further comprising a release member that cooperates with the handle, the release member comprising two cantilevered springs disposed against the handle, the release member further comprising two cantilevered handle engagement members attached to the collar, wherein, upon compression of the cantilevered handle engagement members against the handle, the cantilevered springs become compressed and the collar moves toward the handle such that the at least one cog is lifted out of a notch and the collar disengages with the rim to enable the handle and the valve element to rotate between the locked open position and the locked closed position, the handle engagement members comprising at least one hole to accommodate a locking device to block the movement of the handle engagement members toward the handle and to thereby prevent engagement of the release member to unlock the valve element.

2. The valve of claim 1 wherein the valve is a ball valve.

* * * * *

UNITED STATES PATENT AND TRADEMARK OFFICE
CERTIFICATE OF CORRECTION

PATENT NO. : 6,260,819 B1  Page 1 of 1
DATED : July 14, 2001
INVENTOR(S) : Vagan Ovsepyan It is certified that error appears in the above-identified patent and that said Letters Patent is hereby corrected as shown below:

<u>Title page,</u>
Item [73], Assignee, should read as follows:
-- [73] Assignee: Spears Manufacturing Co., Sylmar, CA (US) --.

Signed and Sealed this

Twelfth Day of February, 2002

*Attest:*

*Attesting Officer*

JAMES E. ROGAN
*Director of the United States Patent and Trademark Office*